United States Patent [19]

Moertel

[11] 4,402,115
[45] Sep. 6, 1983

[54] SLIDE FASTENER STRINGER WITH STABILIZED TEXTILE TAPES

[75] Inventor: George B. Moertel, Conneautville, Pa.

[73] Assignee: Talon, Inc., Meadville, Pa.

[21] Appl. No.: 177,708

[22] Filed: Aug. 13, 1980

[51] Int. Cl.³ .............................................. A44B 19/00
[52] U.S. Cl. ............................. 24/205.16 R; 264/251; 24/205 R
[58] Field of Search ......... 24/205, 205.1 R, 205.13 R, 24/205.16 R; 264/251, 252

[56] References Cited

U.S. PATENT DOCUMENTS

| 1,933,290 | 10/1933 | Winterhalter | 24/205 |
| 2,056,856 | 10/1936 | Hora | 24/205.16 R |
| 2,117,897 | 5/1938 | Marinsky | 24/205.13 R |
| 2,184,265 | 12/1939 | Winterhalter | 264/251 X |
| 2,225,286 | 12/1940 | Poux | 24/205 |
| 2,341,404 | 2/1944 | Winterhalter | 264/252 |
| 2,463,840 | 3/1949 | Winterhalter | 24/205 X |
| 2,910,754 | 11/1959 | Morin | 24/205.1 R |
| 3,124,871 | 3/1964 | Ryser | 24/205 X |
| 3,890,679 | 6/1975 | Simon | 264/252 |

Primary Examiner—Ramon S. Britts
Assistant Examiner—Peter A. Aschenbrenner
Attorney, Agent, or Firm—Anthony A. O'Brien

[57] ABSTRACT

A slide fastener stringer with coupling elements molded on inner edge portions of a tape has connecting portions molded through openings formed in the tape between upper and lower leg portions molded on the upper and lower sides of the tape. The openings in the tape are formed by displacement of tape material in the tape and setting of at least a portion of the displaced tape material in regions adjacent each of the openings to maintain the openings during the molding.

6 Claims, 21 Drawing Figures

SLIDE FASTENER STRINGER WITH STABILIZED TEXTILE TAPES

TECHNICAL FIELD

The present invention relates to slide fasteners, and to the manufacture thereof, wherein coupling elements are molded on edge portions of textile tapes with apertures in the tapes receiving molded connecting portions between upper and lower leg portions.

DESCRIPTION OF THE PRIOR ART

The prior art, as exemplified in U.S. Pat. No. 2,225,286, No. 2,910,754 and No. 3,124,871, contains a number of slide fasteners and techniques for manufacturing the same wherein coupling elements are molded to edge portions of a tape which have openings or apertures formed therein to form molded connecting portions of the coupling elements through such apertures. Generally, the prior art apertures or openings are formed by cutting openings through the tape or by leaving open gaps during weaving of the tape, for example leaving out the warp threads in an area adjacent an edge of the tape to form spaces between the weft thread picks. Forming apertures by cutting or by leaving gaps in the weaving results in reduced strength of the tape in the area supporting the coupling elements.

SUMMARY OF THE INVENTION

The invention is summarized in a slide fastener stringer including a tape having a row of closely spaced openings surrounded by displaced tape material in a inner edge portion of the tape, a plurality of spaced coupling elements molded onto the inner edge portion with pairs of leg portions molded on the opposite sides of the inner edge portion and with joining portions molded through the openings and joining opposite leg portions of each pair of leg portions together, the tape having at least one stabilized portion adjacent to each of the openings, and the stabilized portions having compacted tape material including at least some of the displaced tape material which is set sufficiently to maintain the opening.

An object of the invention is to construct a slide fastener with molded coupling elements having substantially improved strength.

Another object of the invention is to form openings in an inner edge portion of a tape by displacing closely positioned fibers or tape material and setting the fibers or tape material in the displaced position.

One advantage of the invention is that openings formed by displacing fibers, such as textile threads, and setting the displaced fibers in their displaced position forms holes permitting molding of connecting portions of coupling elements through the openings.

One feature of the invention is substantially improved strength in a slide fastener stringer since textile threads are not cut or left out to form openings.

Other objects, advantages, and features of the invention will be apparent from the following description of the preferred embodiment taken in conjunction with the accompanying drawings.

DESCRIPTION OF THE PREFERRED EMBODIMENT

Figure 1:
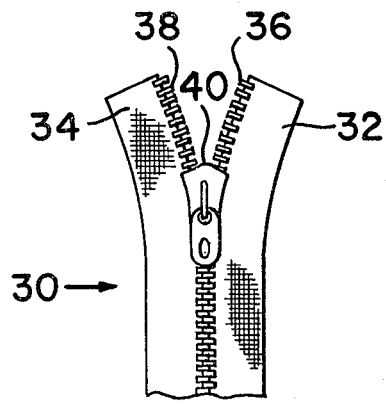
FIG. 1 is a plan view of a slide fastener constructed in accordance with the invention.

As illustrated in FIG. 1, a slide fastener indicated generally at 30 and manufactured in accordance with the invention includes a pair of tapes 32 and 34 with rows of coupling elements 36 and 38 mounted on inner edges of the respective tapes 32 and 34. A slider 40 is slidably mounted on the rows of coupling elements 36 and 38 for opening and closing the slide fastener. The tape 32 and coupling elements 36 form a right stringer for the slide fastener while the tape 34 and coupling elements 38 form left stringer which is substantially a mirror image of the right stringer.

Figure 2:
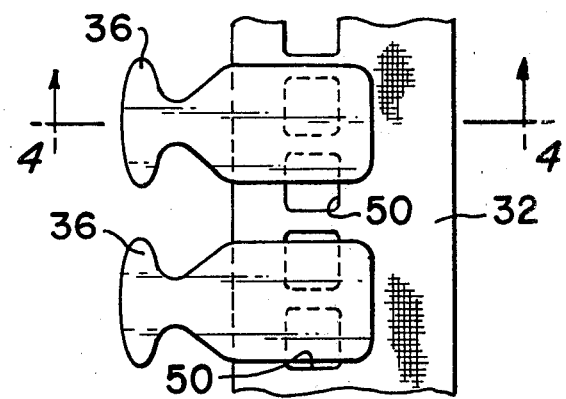
FIG. 2 is a enlarged plan view of one section of a stringer of the slide fastener of FIG. 1.
Figure 3:
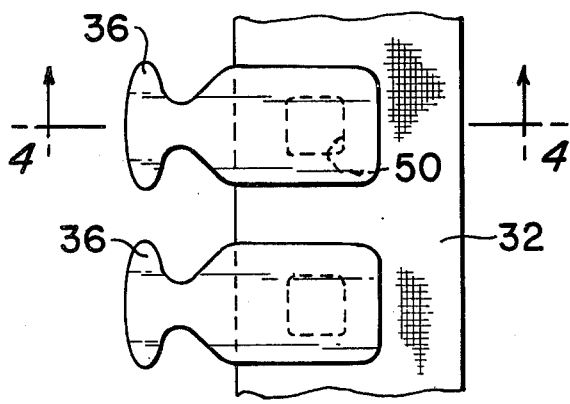
FIG. 3 is a view similar to FIG. 2 but of a modified stringer in accordance with the invention.
Figure 4:
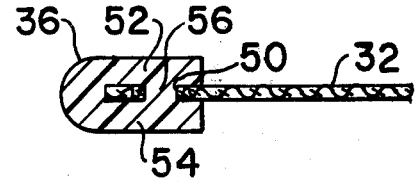
FIG. 4 is a cross sectional view taken at line 4—4 in FIG. 2.

As illustrated for the right stringer in FIGS. 2 and 4, the tape 32 has a plurality of openings or apertures 50 formed in the inner edge portion thereof. The coupling elements 36 are molded on the inner edge portion of the tape 32 with a leg portion 52 molded on the top side of the tape 32 and a lower leg portion 54 molded on a lower side of the tape. A connecting or joining portion 56 is molded through the opening 50 and joins the upper leg portion 52 to the lower leg portion 54. In FIG. 2, the openings 50 are closely spaced and randomly positioned relative to the coupling elements 36 so that the coupling elements are molded upon at least portions of two or more of the openings 50; in a variation illustrated in FIG. 3, the spacing of the openings 50 is equal to the spacing of coupling elements 36 with the coupling elements 36 being aligned with and molded on respective openings.

Figure 5:
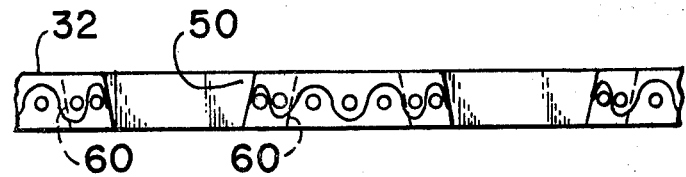
FIG. 5 is a sectional view of a tape used in forming the stringer of FIG. 2.

The tape 32 is preferably formed from densely woven textile threads made of fibers of a thermoplastic material such as nylon, polyester, polyolefin, etc. or containing at least a substantial portion of the fiber content thereof of such thermoplastic fibers. Non-woven tapes containing similar fibrous material, or containing material which is resiliently displaceable and which is also heat-settable, can be employed; for example, tapes formed from a foamed thermoplastic material which can be displaced and set in the displaced position can be employed. The openings 50 are formed by displacement of the tape material or threads and setting of the material or threads in their displaced position. As shown in FIG. 5 for the tape 32 of the preferred textile material, regions 60 surrounding each of the openings 50 contain compacted textile threads which are set in their compacted and displaced position. Such setting is performed by heating of the textile fibers, for example by ultrasonic energy, to produce a thermoset condition of the displaced threads. The textile fibers in the region 60 are not fused; however some bonding or welding between engaging surface portions of the threads may occur. When heated above the glass transition temperature, the thermoplastic fibers can be set into a displaced position overcoming the tendency for the elasticity and resilience of the threads to close the opening. Thermoplastic fibers or material in non-woven tapes is similarly displaced and set without fusion.

Figure 6:
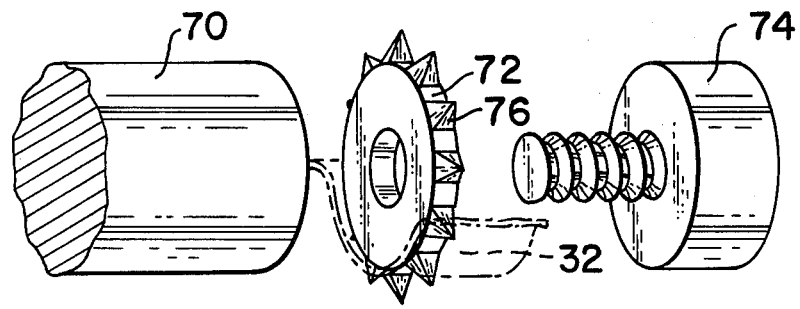
FIG. 6 is an exploded view of a portion of a apparatus used for forming apertures in the tape of FIG. 5.

As shown in FIG. 6, an apparatus for making the openings 50 in the tape 32 includes an ultrasonic horn tip 70 on which is mounted a wheel 72 by means of a headed bolt 74. The wheel 72 is free to rotate but is ultrasonically vibrated by the horn tip 70. The wheel 72 has a plurality of pointed projections 76, illustrated as being pyramidal in FIG. 6, formed on the periphery of the wheel 72 and spaced according to the desired spacing of the openings 50 in the tape 32. In operation, the tape 32 is forced onto the wheel 72 as it is pulled past the wheel. The pointed projections 76 penetrate through the tape 32 and separate the thermoplastic threads thereof, forming the shape of the opening 50. Ultrasonic vibrations transmitted from the horn tip 70 through the wheel 72 and the projections 76 result in compaction and setting of the displaced thermoplastic threads in the regions 60. In the absence of the ultrasonic setting of the threads of the tape, the openings 50 would close by the resilience and elasticity of the threads in the tape thus preventing the subsequent molding of joining portions 56 through openings. After the openings 50 have been formed by displacement of threads or fibers and some of the displaced threads of fibers have been set, the tape is subjected to a molding process in a conventional manner to form a slide fastener stringer.

The slide fastener stringer manufactured with the textile threads thereof displaced and set in a displaced position has substantially greater strength than stringers manufactured with openings cut through the threads or openings formed by the absence of threads. Substantially the full strength of the tapes is maintained by such displacement and setting. Further, by not producing any substantial fusion of the textile threads within the compacted and set regions 60 of the tape 32, the fiber strength is not deteriorated.

Figure 7:
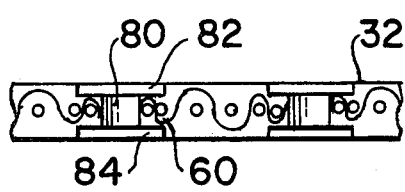
FIG. 7 is a sectional view of a modified tape for forming a slide fastener stringer in accordance with the invention.
Figure 8:
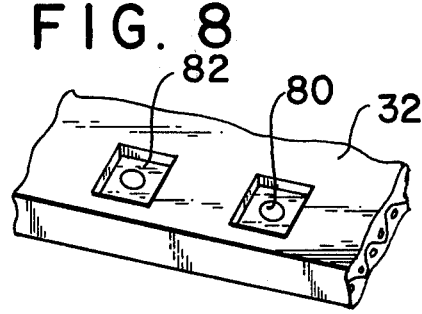
FIG. 8 is a perspective view of a broken-away portion of the tape of FIG. 7.
Figure 9:
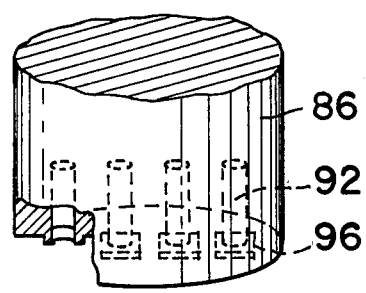
FIG. 9 is a perspective view of an apparatus for forming apertures or openings in the modified tape of FIGS. 7 and 8.
Figure 9:
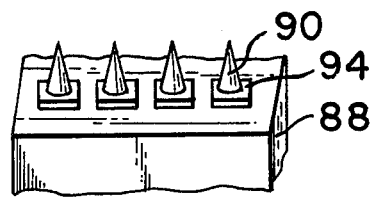

A modification of the tape 32 for the slide fastener stringer, shown in FIGS. 7 and 8, includes round openings 80. Regions 60 of compressed set fibers surrounding the opening 80 are formed by depressions 82 and 84 on the upper and lower side of the tape 32 surrounding the opening 80. An apparatus suitable for making the modified openings of FIGS. 7 and 8, as illustrated in FIG. 9, includes an ultrasonic horn tip 86 and an anvil 88. Pins 90 project upward from the anvil 88 to cooperate with the openings 92 in the horn tip 86 to form the openings 80. Land areas 94 and 96 on the respective anvil and horn tip surround the pins 90 and openings 92 to form the depressed areas 82 and 84 by compacting and setting the fibers around the openings 80 to maintain the openings 80.

Figure 10:
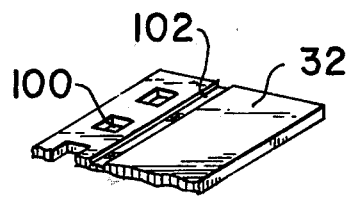
FIG. 10 is a perspective view of a broken-away portion of a second modified tape for forming a slide fastener stringer in accordance with the invention.
Figure 11:
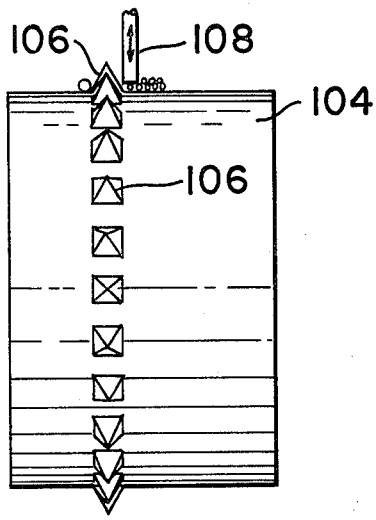
FIG. 11 is an elevation view of a portion of a apparatus for forming apertures in the modified tape of FIG. 10.

In the second modified tape illustrated in FIG. 10, openings 100 are maintained in the tape 32 by a channel 102 formed adjacent to openings 100. The fibers are set and compacted in the channel 102 to maintain the openings 100. An apparatus for forming the openings 100 and channel 102 is illustrated in FIG. 11 and includes a wheel 104 with teeth 106 for projecting through the tape 10 to spread the fibers and form the openings 100 with a cooperating ultrasonic tool 108 for compacting and setting the fibers in the channel 102. Some of the threads displaced by the teeth 106 extend in or across the channel 102 and thus are set by the ultrasonic tool 108 to maintain the openings 100.

Figure 12:
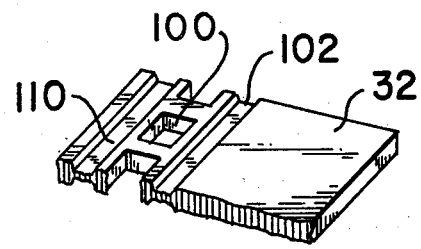
FIG. 12 is a perspective view of a broken-away portion of a third modified tape for forming a slide fastener stringer in accordance with the invention.
Figure 13:
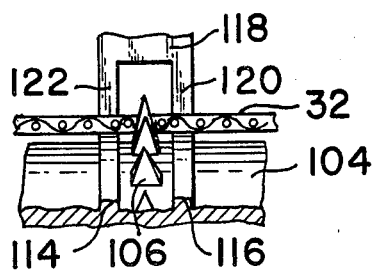
FIG. 13 is elevation view of a portion of a apparatus for forming apertures in the modified tape of FIG. 12.

In FIG. 12, a third modified tape is illustrated and includes a second channel 110 in addition to the channel 102. The second channel 110 is located on the opposite side of the openings 110 to set displaced thermoplastic fibers in the tape 32 to maintain the openings 100. A modified mechanism includes, as illustrated in FIG. 13, a pair of ribs 114 and 116 on the wheel 104 together with a bifurcated ultrasonic tool 118 which has projections 120 and 122 cooperating with the ribs 114 and 116 to form the channels 102 and 110 in the tape 32.

Figure 14:
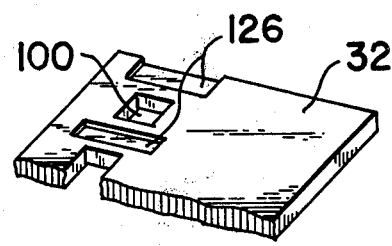
FIG. 14 is a perspective view of broken-away portion of a fourth modified tape for forming a slide fastener stringer in accordance with the invention.
Figure 15:
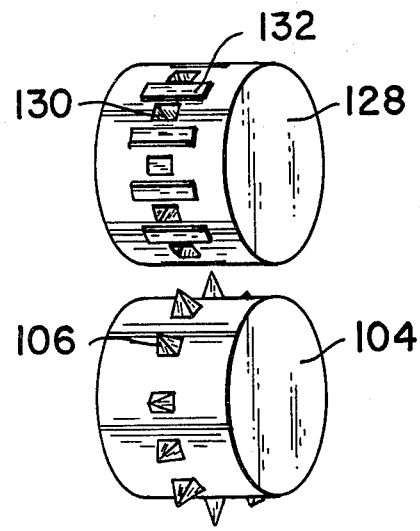
FIG. 15 is a perspective view of a portion of a apparatus for forming apertures in the modified tape of FIG. 14.

A fourth modified tape, shown in FIG. 14, includes bar regions 126 extending between the openings 100 and having set and compacted displaced fibers therein maintaining the openings 100. The bar regions 126 may be formed by the apparatus illustrated in FIG. 15 which includes a upper wheel 128 cooperating with the lower wheel 104 with the projections 106. The upper wheel 128 has openings 130 for receiving the projections 106 and has bars or raised land areas 132 positioned between the openings 130 for forming regions 126 of the tape 32. One of the wheels 104 and 128 is connected to an ultrasonic horn, for example in the same manner as the wheel 72 of FIG. 6.

Figure 16:
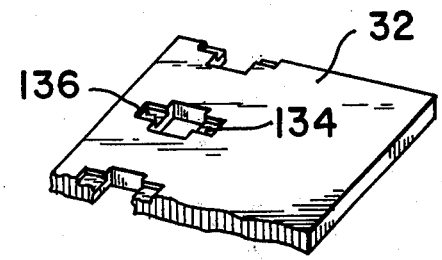
FIG. 16 is a perspective view of a broken-away portion of a fifth modified tape for forming a slide fastener stringer in accordance with the invention.
Figure 17:
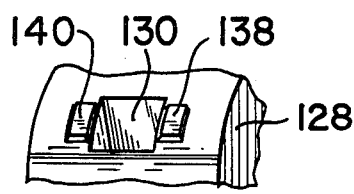
FIG. 17 is a perspective view of a broken-away portion of an apparatus for forming apertures in the modified tape of FIG. 16.

As illustrated in FIG. 16, a fifth modification of the tape for forming the stringer in accordance with the invention includes regions 134 and 136 disposed on opposite sides of the openings 100 wherein displaced threads of the tape 32 are compacted and set to maintain the opening 100. To form the regions 134 and 136, a modification of the wheel 128 as shown in FIG. 17 includes raised land areas 138 and 140 on opposite sides of the openings 130 for cooperating with the wheel 104 of FIG. 15.

Figure 18:
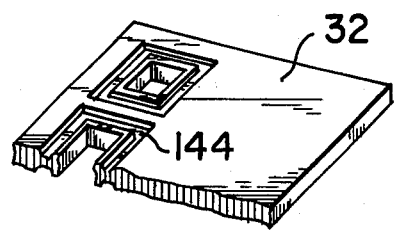
FIG. 18 is a perspective view of a broken-away portion of a sixth modified tape for forming a slide fastener stringer in accordance with the invention.
Figure 19:
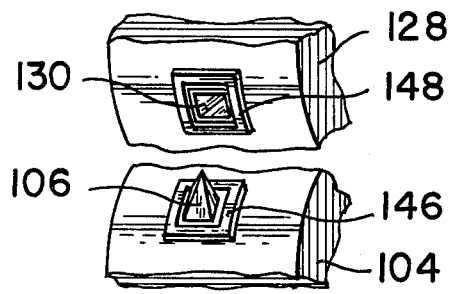
FIG. 19 is a perspective view of a broken-away portion of an apparatus for forming apertures in the modified tape of FIG. 18.

In FIG. 18, a sixth modified tape includes regions 144 extending completely around the openings 100 with compacted and set displaced threads for maintaining the openings 100. Modified wheels 104 and 128 illustrated in FIG. 19 include raised land areas 146 and 148 in the form of window openings surrounding the projections 106 and openings 130, respectfully, for forming the regions 144.

Figure 21:
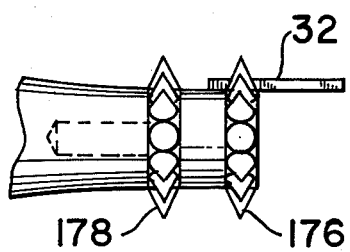
FIG. 21 is an enlarged view of a portion of the apparatus of FIG. 20.
Figure 20:
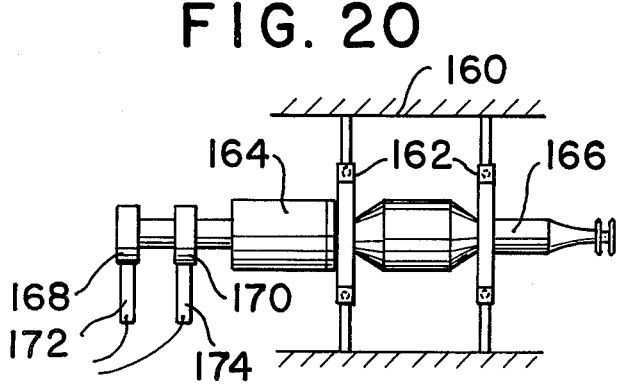
FIG. 20 is a elevation view of another variation of an apparatus for forming openings in tapes in accordance with the invention.

An alternative apparatus for forming openings in the tapes by displacing threads and compacting and setting displaced threads in regions surrounding the openings is illustrated in FIGS. 20 and 21. This apparatus includes a support 160 with bearings 162 rotatively supporting an ultrasonic mechanism 164 with an ultrasonic horn 166. Suitable means (not shown) is provided for rotating the ultrasonic mechanism 164 in the bearings 162. Slip rings 168 and 170 connected to the ultrasonic mechanism 164 are engaged by brushes 172 and 174 to provide power for the ultrasonic mechanism 164. The tip of the horn 166 has a pair of rows of projections 176 and 178 around the circumference thereof for entering and displacing the threads of a pair of tapes on inner regions or portions thereof to form openings in the tapes. Ultrasonic energy then sets the threads to maintain the openings sufficiently so that subsequent molding of the coupling elements can be performed with connecting regions through the openings.

Since many variations, modifications and changes in detail may be made to the above described embodiments, it is intended that all manner in the foregoing description and shown in the accompanying drawings be interpreted as illustrative and not in a limiting sense.

What is claimed is:

1. A slide fastener stringer comprising
a tape having a row of closely spaced openings surrounded by displaced tape material in an inner edge portion of the tape,
a plurality of spaced coupling elements molded onto the inner edge portion with pairs of leg portions molded on the opposite sides of the inner edge portion and with joining portions molded through the openings and joining opposite leg portions of each pair of leg portions together,
said tape having at least one stabilized portion adjacent each of the openings,
said stabilized portion having compacted tape material including at least some of the displaced tape material which is set sufficiently to maintain the openings, and
wherein the tape includes a channel extending longitudinally through the tape adjacent the openings and including at least some of the displaced tape material which is compacted and set to form stabilized portions.

2. A slide fastener stringer comprising
a tape having a row of closely spaced openings surrounded by displaced tape material in an inner edge portion of the tape,
a plurality of spaced coupling elements molded onto the inner edge portion with pairs of leg portions molded on the opposite sides of the inner edge portion and with joining portions molded through the openings and joining opposite leg portions of each pair of leg portions together,
said tape having at least one stabilized portion adjacent each of the openings,
said stabilized portion having compacted tape material including at least some of the displaced tape material which is set sufficiently to maintain the openings, and
wherein the tape includes a pair of channels extending longitudinally through the length of the tape adjacent the openings and on opposite sides of the openings, said pair of channels including compacted and set tape material to form at least two stabilized portions adjacent each opening to maintain the openings.

3. A slide fastener stringer as claimed in claim 1 or 2 wherein the tape is a woven textile tape including fibers formed from thermoplastic which in said stabilized portions are compacted and thermoset sufficiently to maintain the opening.

4. A method of forming a slide fastener stringer comprising
displacing the tape material in an inner edge portion of a tape to form openings therein,
setting at least a portion of the displaced tape material in a region adjacent each of the openings to maintain the openings,
molding coupling elements on the inner edge portion with leg portions on opposite sides of the inner edge portion and with connecting portions extending through the openings in the tape and joining opposite leg portions, and
wherein the setting of the tape material is performed in a longitudinal channel extending through the length of the tape adjacent the row of openings.

5. A method of forming a slide fastener stringer comprising
displacing tape material in an inner edge portion of a tape to form openings therein,
setting at least a portion of the displaced tape material in a region adjacent each of the openings to maintain the openings,
molding coupling elements on the inner edge portion with leg portions on opposite sides of the inner edge portion and with connecting portions extending through the openings in the tape and joining opposite leg portions, and
wherein the setting of the tape material of the tapes is performed in a pair of channels extending on respective opposite sides of the openings longitudinally throughout the length of the tape.

6. A method as claimed in claim 4 or 5 wherein the displacing includes displacing textile threads in a woven tape containing thermoplastic fibers, and the setting includes thermosetting thermoplastic fibers in the displaced textile threads.

* * * * *